UNITED STATES PATENT OFFICE.

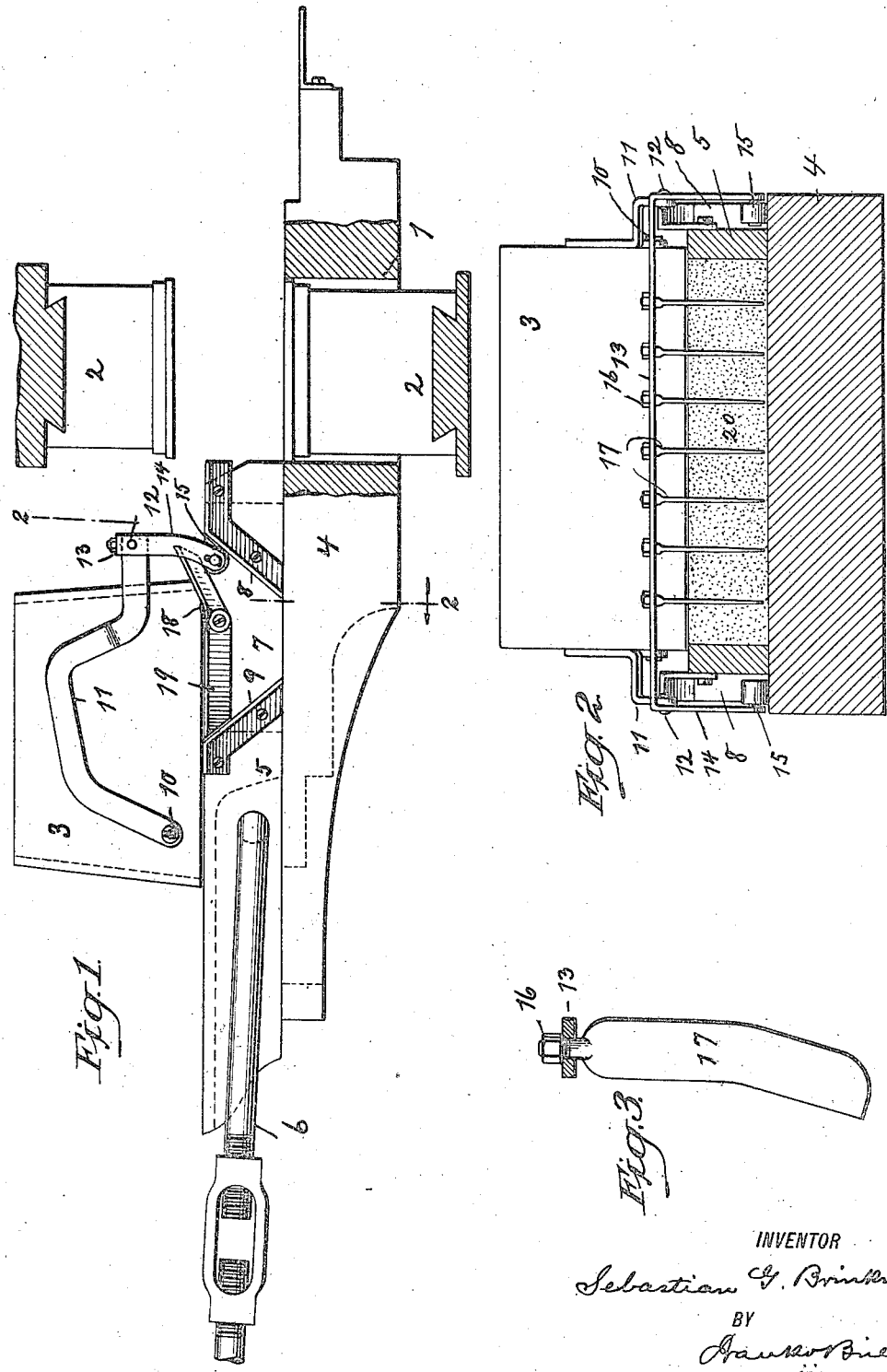

SEBASTIAN G. BRINKMAN, OF FORDS, NEW JERSEY, ASSIGNOR OF ONE-HALF TO LE ROY H. MINTON, OF METUCHEN, NEW JERSEY.

AUTOMATIC MOLD-FILLING DEVICE FOR DRY-PRESS AND SEMIDRY-PRESS MACHINES.

1,247,213. Specification of Letters Patent. Patented Nov. 20, 1917.

Application filed September 12, 1917. Serial No. 190,895.

*To all whom it may concern:*

Be it known that I, SEBASTIAN G. BRINKMAN, a citizen of the United States, and a resident of Fords, in the county of Middlesex and State of New Jersey, have invented certain new and useful Improvements in Automatic Mold-Filling Devices for Dry-Press and Semidry-Press Machines, of which the following is a specification.

In the pressing of certain classes of clay and other materials more moisture is required to effect the proper physical bond than can be used successfully with present means in the pressing of materials by the dry press, or dust press process, as it is known in the trades. For example, the manufacture of dry pressed fire brick has heretofore not been as successful as the plastic pressed process for the reason that it has been impracticable to introduce the material into the molds moist enough to form a sufficient bond. The same difficulty is met in numerous other lines, other than clay materials.

This invention relates more particularly to machines used in the dry pressing, or semi-dry pressing of clay materials. As an illustration, this invention is shown as applied to a dry press brick machine. By the increase of moisture referred to above, the clay has a tendency to bridge over the mold and prevents it from falling into and filling the mold. By my invention this bridging is prevented, the clay being cut through while in the charger, in a manner similar to removing the keystone from an arch, which will cause the divided body of material to fall freely into the mold and fill the same. The invention is applicable to machines using either one or more molds, and for all such materials whenever it is desired to use a high content of moisture. It consists in the various features of novelty more fully pointed out in the specification and subjoined claims.

In the accompanying drawing:

Figure 1 is a longitudinal plan partly in section of a mold filling device embodying my invention;

Fig. 2, a section on line 2—2 Fig. 1, and

Fig. 3, a detail of an example of one of the knives.

The mold 1 coöperates with a pair of plungers 2, in the usual or suitable manner. In the rear of the mold, or molds, and in a plane at a distance vertically above same, is mounted a fixed hopper 3, into which the charges are introduced. From mold 1, there extends a rear table 4, upon which is supported a slide constituting the charger proper 5, that has for its object to transfer the charge from the hopper to the mold. Charger 5, is reciprocated in suitable manner by rod 6, and is furnished with an opening 7 extending therethrough from top to bottom. To the sides of this charger are affixed oppositely inclined front and rear guide rails 8 and 9.

To each side of hopper 3 is pivoted at 10, a bent arm 11, that extends a distance beyond the hopper, and to the free ends of arms 11, is fixed at 12, a cutter bar 13, having depending ends 14, so that cutter bar 13 is of substantially inverted broad U shape. Each of the ends 14 carries a friction roll 15, adapted to engage guide rails 8 and 9. To bar 13, there is affixed by nuts 16 and between ends 14, a plurality of spaced depending knives, cutting blades, pins or similar devices 17, which may be of straight, curved or bent shape, the latter embodiment being illustrated in Fig. 3. In illustration are shown knives on the lines through centers of the molds and on lines through the partitions dividing the molds.

To each side of opening 7, of charger 5, there is pivoted at 18, at a point slightly forward of the center line between guides 8 and 9, a rail or finger 19, which is slightly deflected upward in front of pivot 18 to form an inclined section. The beveled free ends of rails 19 are adapted to engage and to be horizontally supported alternately upon the upper ends of guides 8 and 9. Rail 19 may also be pivoted at the center or at a point in rear of center and be weighted at its rear end.

The operation is as follows:—

When the charger is in its retracted position, the charge will drop into same from the hopper 3, so as to fill opening 7, and be supported on rear table 4. In this position the rolls 15 are resting upon horizontal part of rails 8. As the charger advances, its advance will cause the rolls 15 to roll on the horizontal part of guides 8 and then to descend along the inclined part of said guides, and thus allow the cutter bar to move down in such a manner that the knives 17 engage the charge entrapped within opening 7.

The further advance of the charger will cause the knives, owing to the relative movement between the knives and the charger, to divide the charge of material in a manner similar to removing the keystone from an arch, by which the objectionable bridging heretofore referred to is obviated, thereby causing and permitting the divided body of material to fall freely into and fill the mold, or molds.

The advance of the charger being continued, as the molds are being charged, rolls 15 will rest on the rear table 4, and then will ascend on inclined part of guides 9, to correspondingly raise the cutter bar together with the knives, or pins, and to momentarily tilt rails 19 on fulcrums 18. In this way, the rolls clear rails 19 and move onto the horizontal parts of guides 9, while the rails 19 resume their normal position in which their rear ends rest on guides 9 to sustain the knives in their raised position during the return movement of the charger.

When the movement of the charger is now reversed, its backward movement will cause rolls 15 to roll along rails 19 whereby the cutter bar is sustained in its elevated position. As rolls 15 pass the point of pivot 18, the rails 19 tip forward so that the front ends engage the guides 8, while the rear ends elevate free of guides 9. This permits rolls 15 to continue forward on the horizontal ends of guides 8, but as soon as rolls 15 are free and clear of rails 19, said rails tilt backward so that their rear ends engage guides 9 while their front ends rise sufficiently above guides 8 to permit the rolls to pass under the rails 19 on the return movement of the charger, which now again takes place.

I claim:

1. An automatic mold filling device comprising a mold, a charging slide having an opening, a cutter adapted to be projected into said opening, and means for effecting a relative movement between slide and cutter.

2. An automatic mold filling device comprising a mold, a charging slide having an opening, a cutter, means for lowering said cutter into said opening, and means for effecting a relative movement between slide and cutter.

3. An automatic mold filling device comprising a mold, a charging slide having an opening, a cutter, means for lowering said cutter into said opening, means for effecting a relative movement between slide and cutter, and means for raising said cutter out of said opening.

4. An automatic mold filling device comprising a mold, a charging slide having an opening, a cutter, means for lowering said cutter into said opening, means for effecting a relative movement between slide and cutter, means for raising said cutter out of said opening, and means for sustaining said cutter in its raised position during the return movement of the slide.

5. An automatic mold filling device, comprising a mold, a hopper, an intervening charging slide, a cutter bar pivotally mounted on the hopper, and a cutter carried by said bar and adapted to be projected into the slide.

6. An automatic mold filling device, comprising a mold, a hopper, an intervening charging slide, arms pivoted to the hopper, a cutter bar carried by the arms, and a cutter depending from the cutter bar and adapted to be projected into the slide.

7. An automatic mold filling device, comprising a mold, a hopper, an intervening charging slide, having inclined guides, arms pivoted to the hopper, a cutter bar carried by the arms, a cutter depending from the cutter bar, and rolls on the cutter bar that are adapted to engage said guides.

8. An automatic mold filling device, comprising a mold, a hopper, an intervening charging slide having inclined guides and pivoted rails, arms pivoted to the hopper, a cutter bar carried by the arms, a cutter depending from the cutter bar, and rolls on the cutter bar that are adapted to engage said guides and rails.

SEBASTIAN G. BRINKMAN.

Copies of this patent may be obtained for five cents each, by addressing the "Commissioner of Patents, Washington, D. C."